United States Patent
Cheng et al.

(10) Patent No.: US 7,061,560 B2
(45) Date of Patent: Jun. 13, 2006

(54) LIQUID CRYSTAL DISPLAY HAVING A NARROW FRAME AREA

(75) Inventors: Jia-Shyong Cheng, Taoyuan (TW); Chieh-Hsiung Yang, Taoyuan (TW)

(73) Assignee: Hannstar Display Corp., Taipei (TW)

( * ) Notice: Subject to any disclaimer, the term of this patent is extended or adjusted under 35 U.S.C. 154(b) by 89 days.

(21) Appl. No.: 10/817,357

(22) Filed: Apr. 2, 2004

(65) Prior Publication Data

US 2005/0094062 A1 May 5, 2005

(30) Foreign Application Priority Data

Oct. 29, 2003 (TW) .............................. 92130145 A

(51) Int. Cl.
*G02F 1/1333* (2006.01)
*G02F 1/13339* (2006.01)

(52) U.S. Cl. ...................... 349/111; 349/110; 349/153; 349/190

(58) Field of Classification Search ................. 349/42, 349/43, 110, 111, 153, 190
See application file for complete search history.

(56) References Cited

U.S. PATENT DOCUMENTS 5,432,626 A * 7/1995 Sasuga et al. ............... 349/58
5,739,880 A   4/1998 Suzuki et al. ............... 349/190
5,851,411 A  12/1998 An et al. ..................... 216/23
6,057,903 A * 5/2000 Colgan et al. ............. 349/139
6,552,764 B1  4/2003 Fujioka et al. ............. 349/106
6,636,284 B1* 10/2003 Sato .......................... 349/110
6,879,369 B1* 4/2005 Lee et al. ................... 349/187

FOREIGN PATENT DOCUMENTS

JP    09-033944   * 2/1997
TW      482913    5/1989

* cited by examiner

*Primary Examiner*—Tarifur R. Chowdhury

(74) *Attorney, Agent, or Firm*—Volpe and Koenig, PC

(57) ABSTRACT

The present invention discloses a liquid crystal display with a narrow frame area. The liquid crystal display comprises a first substrate, plural scan line metal layers and plural data line metal layers formed on the first substrate, a second substrate attached to the first substrate by applying a seal at a periphery of one of the first substrate and the second substrate, and an opaque layer formed on the second substrate at the inside of the seal. In which, the scan line metal layers and the data line metal layers extend to the outside of the seal, and overlap with each other to form an integrated black matrix on the first substrate, which overlaps with the opaque layer on the second substrate so as to prevent a light leakage in an overlapped area thereof and narrow down the frame area.

22 Claims, 4 Drawing Sheets

LIQUID CRYSTAL DISPLAY HAVING A NARROW FRAME AREA

FIELD OF THE INVENTION

The present invention relates to a liquid crystal display, and more particularly to a liquid crystal display with a narrow frame area.

BACKGROUND OF THE INVENTION

In the current display industry, the liquid crystal display (LCD) has gradually replaced the cathode ray tube (CRT) to become a mainstream product due to its excellent properties of low radiation and low power consumption. The liquid filling method of the conventional liquid crystal display is to suck up the liquid crystal slowly by capillarity, after the upper and lower substrates are assembled. Such liquid filling method is time-consuming and is a waste of liquid crystal. Therefore, a new liquid filling method of one drop fill (ODF) is developed. The one drop fill (ODF) process is to directly drop the liquid crystal onto the lower substrate, and then assemble the upper and lower substrates. This new process greatly reduces the time and the materials for filling the liquid crystal, and thus it is absolutely advantageous to the display panel with super large size.

Please refer to FIG. 1 showing a cross-sectional view of the liquid crystal display formed by the one drop fill (ODF) process according to the prior art. The formed liquid crystal display includes a first substrate 11, a second substrate 13, and a black matrix 14, a scan line metal and a data line metal (not shown) and an active display area 12 enclosed between the first substrate 11 and the second substrate 13, which are attached to each other by a seal 15.

In the one drop fill (ODF) process, the seal 15 is solidified by a UV light. Therefore, the seal 15 has to be completely exposed to the UV light for a better solidification effect. However, the liquid crystal material would be damaged by the UV light, and hence, the liquid crystal in the active display area 12 must be protected by a UV shield during the exposure to UV light. The simplest way is to use the combination of the color resist of the color filter and the black matrix 14 as a UV shield of the active display area 12. Although this way is simple, it has a disadvantage that the seal 15 must be located at the area outside the black matrix 14 so as to be fully exposed to the UV light for solidification. To prevent the seal 15 from being shielded by the black matrix 14 and in view of the alignment error during the manufacturing process, the seal 15 has to be at a distance from the active display area 12, which results in an increase of the frame area 17 including the black matrix 14 and the seal 15. Therefore, the effective utilization area of the substrate for display is reduced, and is not suitable for use in the portable product, such as a notebook, that demands a narrow frame area.

Therefore, the purpose of this invention is to provide a liquid crystal display with a narrow frame area to overcome the drawbacks of prior art.

SUMMARY OF THE INVENTION

It is an object of the present invention to provide a liquid crystal display with a narrow frame area, in which the metal layers formed in the TFT manufacturing process are deposited and patterned in the frame area to form a UV shield. The way is to use the metal layers, which are the same as the scan line metal layers and the data line metal layers, in the frame area and form an integrated black matrix to prevent a light leakage in the frame area. In addition, the seal can be formed in the overlapped area to further narrow down the frame area of the liquid crystal display.

In accordance with an aspect of the present invention, the liquid crystal display with a narrow frame area comprises a first substrate, plural scan line layers and plural data line metal layers formed on the first substrate, a second substrate attached to the first substrate by applying a seal at a periphery of the first substrate and the second substrate, and an opaque layer formed on the second substrate at the inside of the seal, wherein the scan line metal layers and the data line metal layers extend to the outside of the seal, and overlap with each other to form an integrated black matrix on the first substrate, which overlaps with the opaque layer on the second substrate so as to prevent a light leakage in an overlapped area thereof and narrow down the frame area.

Preferably, the liquid crystal display is manufactured by a one drop fill (ODF) process.

Preferably, the opaque layer is a black matrix.

Preferably, the opaque layer is a mixture of a metal and an oxide of the metal.

Preferably, the opaque layer is a resin with opacity.

Preferably, the resin is one of a black resin and a color resin.

Preferably, the opaque layer is a color filter.

Preferably, the color filter is one selected from a group consisting of a red-colored layer, a green-colored layer, a blue-colored layer and a combination thereof.

Preferably, the seal overlaps with the integrated black matrix.

Preferably, the seal is solidified by a UV light.

Preferably, the integrated black matrix comprises an amorphous silicon layer.

In accordance with a further aspect of the present invention, the liquid crystal display with a narrow frame area comprises a first substrate, plural scan line metal layers and plural data line metal layers formed on the first substrate, a second substrate attached to the first substrate by applying a seal at a periphery of one of the first substrate and the second substrate, and an opaque layer formed on the second substrate at the inside and outside of the seal, wherein the scan line metal layers and the data line metal layers extend to the outside of the seal, and overlap with each other to form an integrated black matrix on the first substrate, which overlaps with the opaque layer on the second substrate so as to prevent a light leakage in an overlapped area thereof and narrow down the frame area.

Preferably, the liquid crystal display is manufactured by a one drop fill (ODF) process.

Preferably, the opaque layer is a black matrix.

Preferably, the opaque layer is a mixture of a metal and an oxide of the metal.

Preferably, the opaque layer is a resin with opacity.

Preferably, the resin is one of a black resin and a color resin.

Preferably, the opaque layer is a color filter.

Preferably, the color filter is one selected from a group consisting of a red-colored layer, a green-colored layer, a blue-colored layer and a combination thereof.

Preferably, the seal overlaps with the integrated black matrix.

Preferably, the seal is solidified by a UV light.

Preferably, the integrated black matrix comprises an amorphous silicon layer.

The above objects and advantages of the present invention will become more readily apparent to those ordinarily

DETAILED DESCRIPTION OF THE PREFERRED EMBODIMENT

Figure 1:
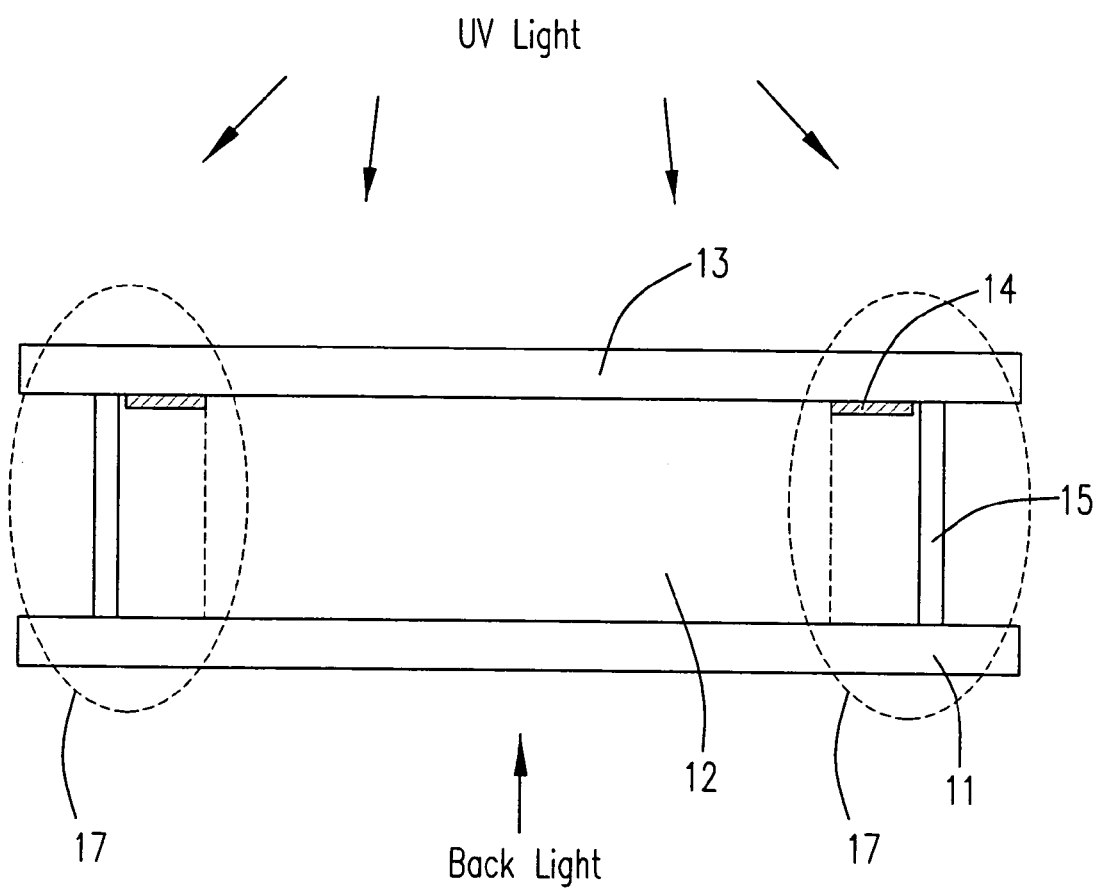
FIG. 1 shows a cross-sectional view of the liquid crystal display formed by the one drop fill (ODF) process according to the prior art.
Figure 2:
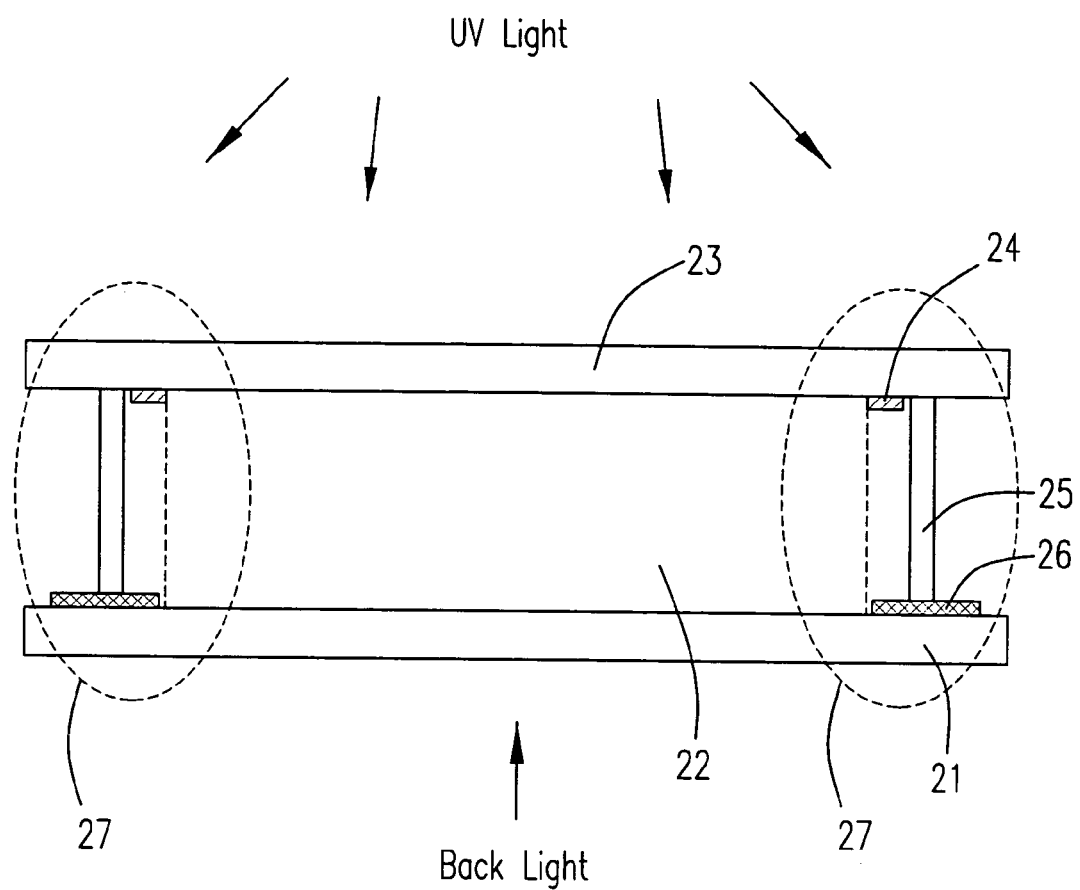
FIG. 2 shows a cross-sectional view of the liquid crystal display formed by the one drop fill (ODF) process according to a preferred embodiment of the present invention.

Please refer to FIG. 2 showing a cross-sectional view of the liquid crystal display formed by the one drop fill (ODF) process according to a preferred embodiment of the present invention. The liquid crystal display includes a first substrate 21, a second substrate 23, and an active display area 22 between the first substrate 21 and the second substrate 23. According to the manufacturing method for the liquid crystal display of the present invention, plural scan line metal (gate metal) layers are formed first on the first substrate 21, and then plural data line metal (source and drain metal) layers are formed on the scan line metal layers. The second substrate 23 is attached to the first substrate 21 via a seal 25, which is coated at an outside periphery of the first substrate and is solidified by a UV light. At least one opaque layer 24, such as a black matrix (BM) or a color filter (CF), is formed on the second substrate 23 at the inside of the seal 25. In which, the color filter can be a red-colored layer, a green-colored layer, a blue-colored layer or a combination thereof. For completely solidifying the seal 25, it is better not to overlap the seal 25 and the opaque layer 24, so that the seal 25 can be completely exposed to the UV light. The first substrate 21 and the second substrate 23 are both glass substrates. In addition, the seal 25 can also be coated at an outside periphery of the second substrate 23.

The main feature of the present invention is that the scan line metal layers and the data line metal layers extend to the outside of the seal 25. The extended scan line metal layers and data line metal layers overlap with each others to form an integrated black matrix 26 so as to prevent a light leakage in the overlapped area and narrow down the frame area 27 of the liquid crystal display. In addition, a semiconductor layer, such as an amorphous silicon layer, or a dielectric layer or a combination of the above layers, can be formed between the extended scan line metal layers and data line metal layers to prevent the short problem.

Figure 3:
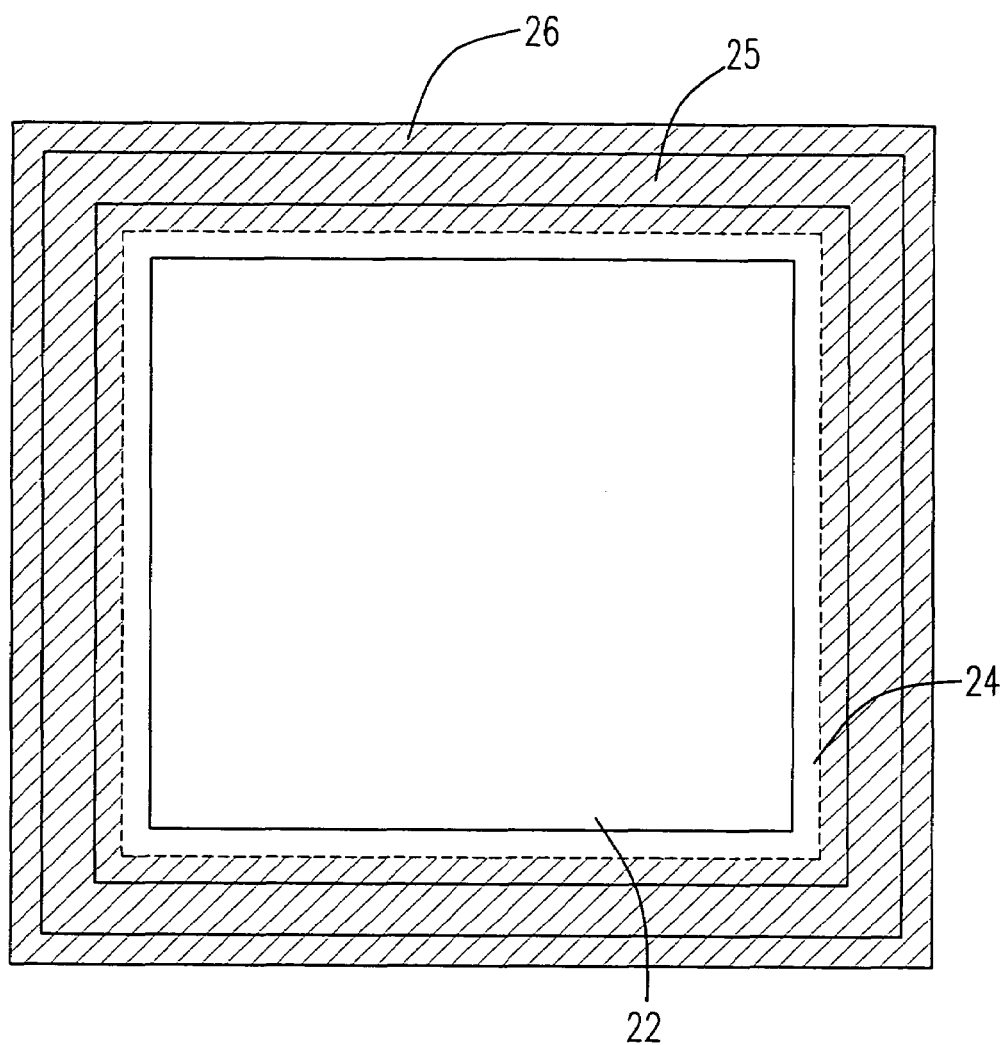
FIG. 3 shows a top view of the liquid crystal display formed by the one drop fill (ODF) process according to a preferred embodiment of the present invention.

Please refer to FIG. 3 showing a top view of the liquid crystal display formed by the one drop fill (ODF) process according to a preferred embodiment of the present invention. As shown in FIG. 3, the central area of the liquid crystal display is the active display area 22, and the areas outside the active display area 22 are sequentially the opaque layer 24, the seal 25, and the integrated black matrix 26 formed by the overlapped scan line metal layers and data line metal layers, in which the opaque layer 24 overlaps with the integrated black matrix 26.

Figure 4:
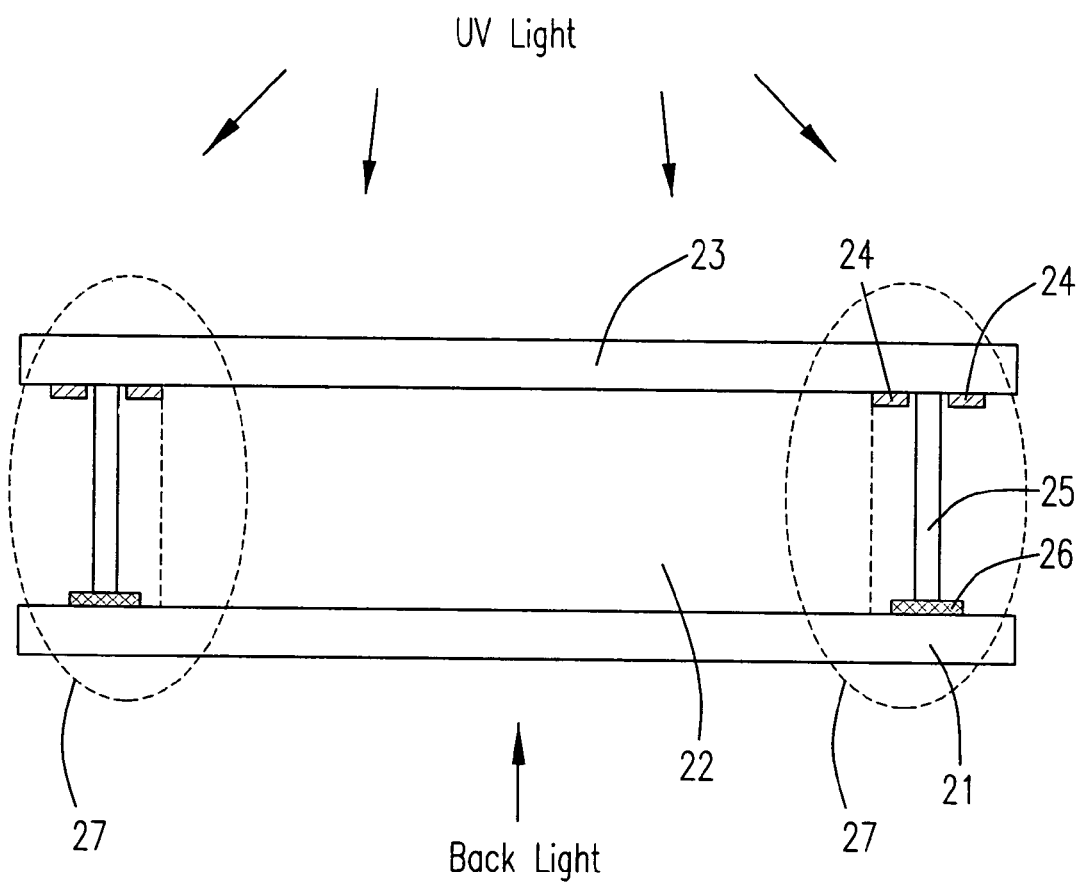
FIG. 4 shows a cross-sectional view of the liquid crystal display formed by the one drop fill (ODF) according to another preferred embodiment of the present invention.

Please refer to FIG. 4 showing a cross-sectional view of the liquid crystal display according to another preferred embodiment of the present invention. In which, the opaque layer 24 can be formed both at the inside and the outside of the seal 25 on the second substrate 23.

The integrated black matrix of the present invention is not limited to the combination of the scan line metal and the data line metal; it can be formed by any other materials that can be used for light-shielding. To prevent a light leakage, the integrated black matrix can overlap with the seal completely or partially. The structure of the present invention can be applied to the amorphous silicon type of liquid crystal display and the poly-silicon type of liquid crystal display.

In conclusion, the liquid crystal display of the present invention includes the scan line metal layers and the data line metal layers extending to the outside of the seal. By the overlap of the extended scan line metal layers and data line metal layers, the integrated black matrix is formed to prevent a light leakage in the overlapped area and narrow down the frame area of the liquid crystal display. Therefore, the present invention overcomes the disadvantages of the prior art and owns the industrial values.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display with a narrow frame area, comprising:
   a first substrate;
   plural scan line metal layers and plural data line metal layers formed on said first substrate;
   a second substrate attached to said first substrate by applying a seal at a periphery of one of said first substrate and said second substrate; and
   an opaque layer formed on said second substrate at the inside of said seal,
   wherein said scan line metal layers and said data line metal layers extend to the outside of said seal, and overlap with each other to form an integrated black matrix on said first substrate, which overlaps with said opaque layer on said second substrate.

2. The liquid crystal display according to claim 1, wherein said liquid crystal display is manufactured by a one drop fill (ODF) process.

3. The liquid crystal display according to claim 1, wherein said opaque layer is a black matrix.

4. The liquid crystal display according to claim 1, wherein said opaque layer is a mixture of a metal and an oxide of said metal.

5. The liquid crystal display according to claim 1, wherein said opaque layer is a resin with opacity.

6. The liquid crystal display according to claim 5, wherein said resin is one of a black resin and a color resin.

7. The liquid crystal display according to claim 1, wherein said opaque layer is a color filter.

8. The liquid crystal display according to claim 7, wherein said color filter is one selected from a group consisting of a red-colored layer, a green-colored layer, a blue-colored layer and a combination thereof.

9. The liquid crystal display according to claim 1, wherein said seal overlaps with said integrated black matrix.

10. The liquid crystal display according to claim 1, wherein said seal is solidified by a UV light.

11. The liquid crystal display according to claim 1, wherein said integrated black matrix comprises an amorphous silicon layer.

12. A liquid crystal display with a narrow frame area, comprising:
- a first substrate;
- plural scan line metal layers and plural data line metal layers formed on said first substrate;
- a second substrate attached to said first substrate by applying a seal at a periphery of one of said first substrate and said second substrate; and
- an opaque layer formed on said second substrate at the inside and outside of said seal,
- wherein said scan line metal layers and said data line metal layers extend to the outside of said seal, and overlap with each other to form an integrated black matrix on said first substrate, which overlaps with said opaque layer on said second substrate.

13. The liquid crystal display according to claim 12, wherein said liquid crystal display is manufactured by a one drop fill (ODF) process.

14. The liquid crystal display according to claim 12, wherein said opaque layer is a black matrix.

15. The liquid crystal display according to claim 12, wherein said opaque layer is a mixture of a metal and an oxide of said metal.

16. The liquid crystal display according to claim 12, wherein said opaque layer is a resin with opacity.

17. The liquid crystal display according to claim 16, wherein said resin is one of a black resin and a color resin.

18. The liquid crystal display according to claim 12, wherein said opaque layer is a color filter.

19. The liquid crystal display according to claim 18, wherein said color filter is one selected from a group consisting of a red-colored layer, a green-colored layer, a blue-colored layer and a combination thereof.

20. The liquid crystal display according to claim 12, wherein said seal overlaps with said integrated black matrix.

21. The liquid crystal display according to claim 12, wherein said seal is solidified by a UV light.

22. The liquid crystal display according to claim 12, wherein said integrated black matrix comprises an amorphous silicon layer.

* * * * *